July 7, 1964   J. L. PECZKOWSKI   3,139,922
COMPENSATED CONTROLLER
Filed Oct. 19, 1959   3 Sheets-Sheet 1
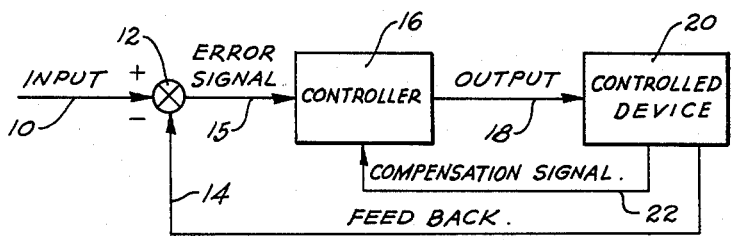
FIG_1
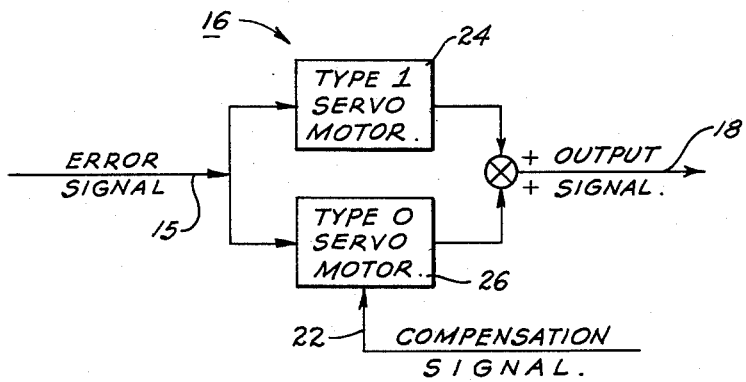
FIG_2
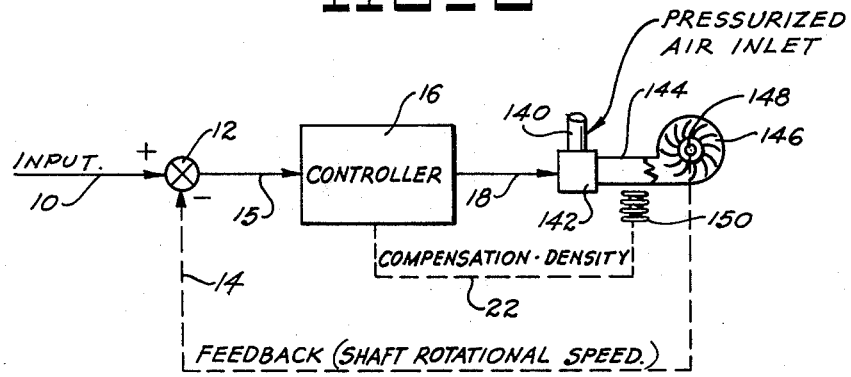
FIG_3
INVENTOR.
JOSEPH L. PECZKOWSKI.
BY
William S. Thompson
AGENT.

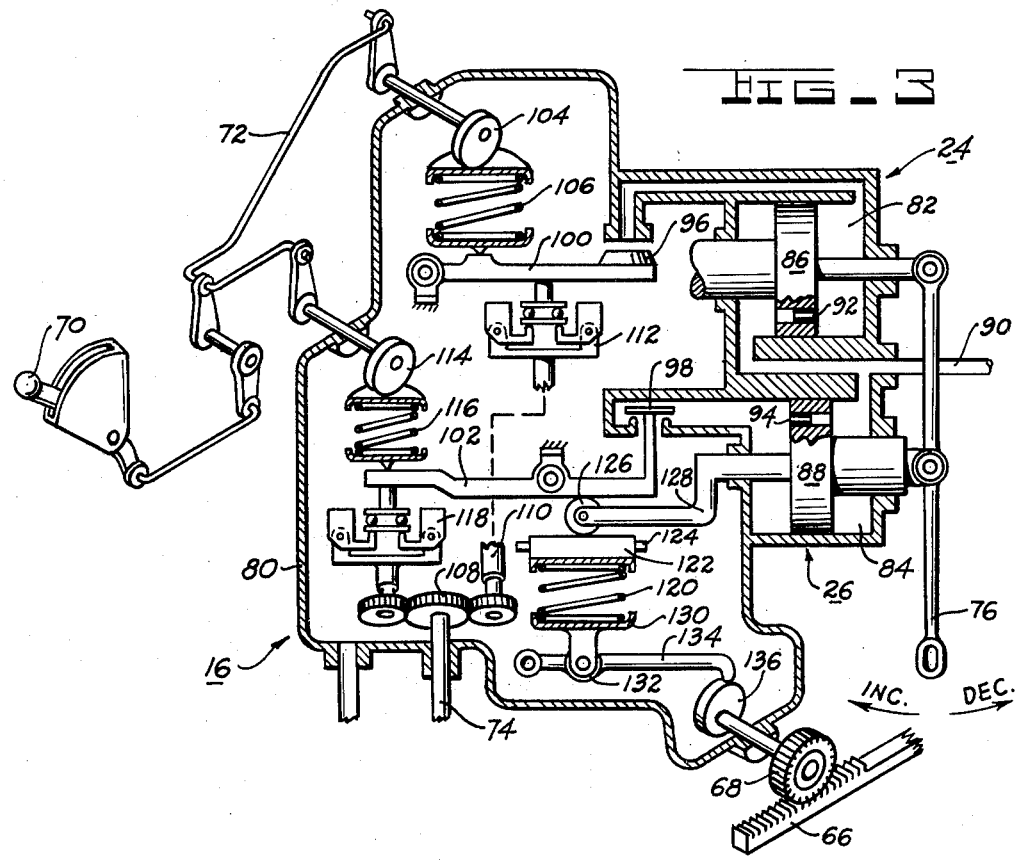
FIG_3
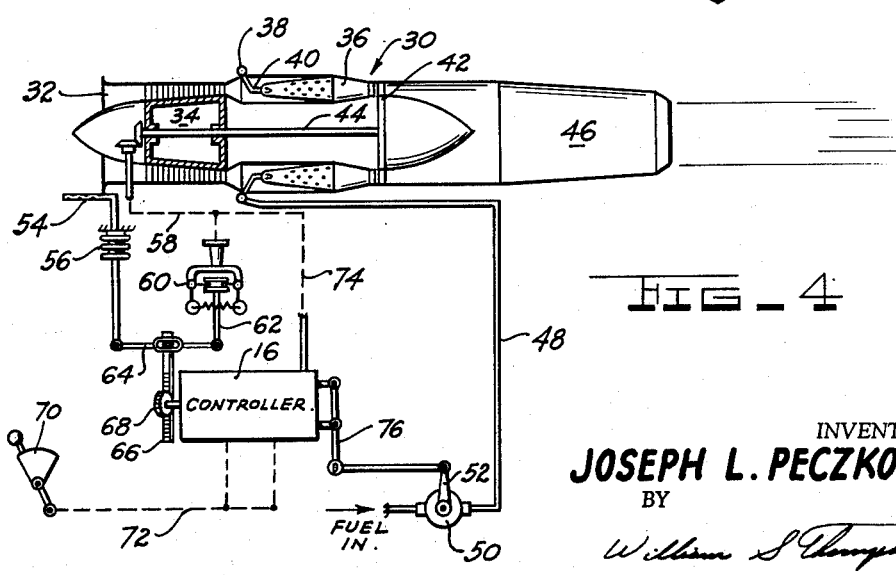
FIG_4
INVENTOR.
JOSEPH L. PECZKOWSKI.
BY
William S Thompson
AGENT.

July 7, 1964     J. L. PECZKOWSKI     3,139,922
COMPENSATED CONTROLLER
Filed Oct. 19, 1959     3 Sheets-Sheet 3
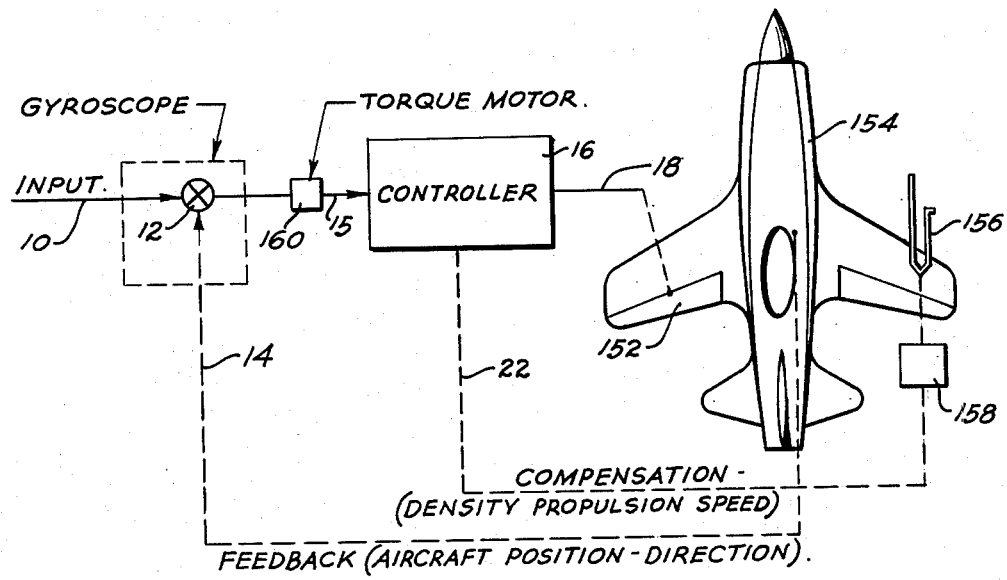
FIG_6
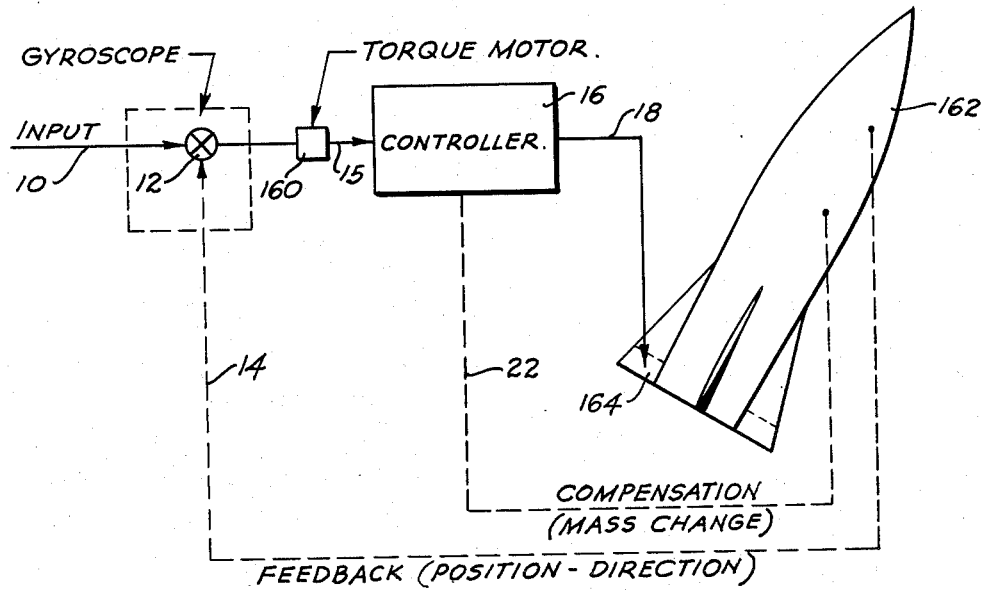
FIG_7
INVENTOR.
JOSEPH L. PECZKOWSKI
BY
William S. Thompson
AGENT.

UNITED STATES PATENT OFFICE

United States Patent Office 3,139,922
Patented July 7, 1964

3,139,922
COMPENSATED CONTROLLER
Joseph L. Peczkowski, South Bend, Ind., assignor to The
Bendix Corporation, a corporation of Delaware
Filed Oct. 19, 1959, Ser. No. 847,330
15 Claims. (Cl. 158—36)

The present invention relates to a controller for use in a feedback control system and more particularly to such a controller which includes a controlled device having a manipulated and a controlled variable wherein the response rate of the controlled variable to variations of the manipulated variable changes with operating conditions.

It is common practice in the servo mechanism art to utilize a servo controller to manipulate a variable of a controlled device, which manipulated variable in turn causes a variation in a controlled variable or condition which it is desired to control. For example, in the aircraft fuel metering art servo controllers are utilized to position a fuel valve (manipulated variable) which may be considered as part of an engine (controlled device) in order that the speed of the engine compressor (controlled variable) may be controlled in response to a certain reference input such as a throttle position. Copending application Serial No. 499,432, filed April 4, 1954, assigned to the same assignee as the present application, discloses an exemplary system.

In such systems it is generally the practice to match the controller gain with the dynamic response rate of the controlled device in order to obtain optimum system response and stability. It has been found that many controlled devices are subject to varying dynamics throughout their range of operation due to changing operating conditions. For example, in the case of a gas turbine engine, variations in altitude pressure, temperature and compressor speed affect the rate at which the controlled variable (compressor speed) responds to the manipulated variable (fuel valve position). Other controlled devices such as air driven turbines, aircraft, and rockets will vary in response with such dissimilar operating conditions as pressure, speed, mass or center of gravity variations. Thus in a feedback control system including a controlled device subject to varying dynamics or response rate the practice of matching controller gain to the response rate of the controlled device is a compromise over a range of widely varying dynamics. The system may then have optimum performance at a given operating condition, but will have a tendency to either become unstable or sluggish at other operating conditions. It is the object therefore of the present invention to provide a controller having a gain which may be varied in response to varying dynamics of a controlled device to provide optimum system performance regardless of variations in operating conditions which affect the response rate of the controlled device.

Other objects and advantages will become apparent to those skilled in the art in view of the following description taken in conjunction with the drawings wherein:

FIGURE 1 is a block diagram functionally illustrating a servo mechanism loop of which the present invention is a part;

FIGURE 2 is a block diagram functionally illustrating my compensated controller;

FIGURE 3 is a more detailed drawing of a preferred embodiment of my compensated controller being sectionalized in part and isometric in part;

FIGURE 4 is a somewhat diagrammatic showing of a system wherein the controlled device is a gas turbine engine and my controller is arranged to control said controlled device;

FIGURE 5 is another diagrammatic showing of a system utilizing my controller wherein the controlled device is an air driven turbine;

FIGURE 6 is still another diagrammatic showing of a system utilizing my controller wherein the controlled device is an aircraft frame; and FIGURE 7 is another diagrammatic showing of a system utilizing my controller wherein the controlled device is a rocket.

Referring to FIGURE 1, the block diagram illustrates a generic servo mechanism loop for which the controller of the present invention is particularly adapted. Basically the servo mechanism loop is one in which the difference between a reference input and some function of a controlled variable is used to supply an actuating error signal to a controller which in turn controls the controlled device. In a mechanical hydraulic system the input represented by the arrow 10 is generally a force or position signal which is transmitted to a comparator or error measuring device 12 where it is compared with a feedback force or position signal represented by the line 14. The comparator output 15 is then an error signal which is a measure of the difference between the input and feedback signals and is transmitted to a controller 16, such as for example of the type to be hereinafter described. The controller 16 amplifies and transforms the error signal to a desirable form producing an output signal 18 which is transmitted to the controlled device 20. The type of controlled device with which the present invention is particularly useful is characterized by the fact that it includes both a manipulated and a controlled variable. The controller 16 is operative to position or otherwise control the manipulated variable, and because of the nature of the controlled device, the controlled variable responds in a given time the variations of the manipulated variable. The controlled device is further characterized by the fact that the time response of the controlled variable in response to changes in the manipulated variable changes with operating conditions. Thus the variations in the operating conditions are sensed at the location of the controlled device and transmitted back to controller 16 by means of connection 22 to compensate controller operation as will later be described. Inasmuch as it is desired to control the value of the controlled variable and the manipulated variable is merely the intermediary through which this end may be accomplished, the feedback connection 14 is operative to transmit a signal that varies as a function of said controlled variable which may be compared with the input signal 10. Thus when the controlled variable is operating at a value in agreement with that requested by the input signal 10, the force levels are such that no error signal 15 is generated. If the controlled variable is at a value different from that requested, the error signal is of such a direction and magnitude that the output signal of controller 16 moves in a corrective direction.

FIGURE 2 is a block diagram illustrating the functional characteristics of my controller 16 and consists of a type 0 servo motor 24 and a type 1 servo motor 26 connected in parallel and having additive outputs. The error, output, and compensation signals are identically numbered as in FIGURE 1, and it is to be noted that the compensation signal 22 is delivered solely to the type 0 servo motor 26 for reasons that will presently be disclosed. A type 0 servo motor is one known in the art as a servo producing an output proportional to a constant actuating error input signal. Thus a small error input will displace the output member a given small amount and a larger error input will displace the output a greater amount. Thus in order to have an output displacement from a given norm position it is necessary to have an existing error input signal and the displacement from the norm position is proportional to the magnitude of the error signal. Such servo motors are also known in the art as proportional servos. A type 1 servo is one wherein the output member is displaced at a rate proportional to the error signal. The output member of a type 1 servo will continue to move as long as an error input signal exists and thus will correct the controlled variable until there is a zero error signal, and it is only the rate of correction that varies with the magnitude of the error signal. The type 1 servo may also be considered an integrating servo in that the variation of the output member is the integral of the error input rather than a direct proportion as in the case of a type 0 servo. In order to utilize the shorthand type 0 and type 1 nomenclature which is useful in disclosing the present invention, the definitions of the terms as outlined above is intended.

FIGURE 3 is an illustration in greater detail of an embodiment of the controller 16 which shows specific structure which may be used when the controller 16 is utilized in a system such as FIGURE 4 wherein the controlled device is a gas turbine engine generally indicated at 30. Turning first to FIGURE 4, the gas turbine engine 30 which is the controlled device includes an air inlet 32; a compressor 34; a plurality of annularly disposed combustion chambers 36 to which fuel is supplied by means of manifold 38 and individual nozzles 40; a turbine 42 driven from the exhaust products of the combustion chambers 36 and drivably connected to compressor 34 by shaft 44; a tailpipe section 46; and means comprising conduit 48, a fuel valve 50, and a pressurized fuel source (not shown) for supplying fuel to the manifold 38 in measured quantities as controlled by the position of lever 52 of the fuel valve 50. In a gas turbine engine of this type, it is often desired to control the speed of compressor 34 by means of manipulating the position or flow permitting area of the fuel valve 50. By increasing the supply of fuel, more energy is developed in the gaseous exhaust products generated in combustion chambers 36 and driving the turbine 42 and compressor 34, such that compressor speed increases with fuel delivered to the main manifold 38. The speed of compressor 34 is therefore the controlled variable and the position of the fuel valve 50 the manipulated variable of a controlled device (gas turbine engine plus fuel delivery system). The rate at which compressor speed responds to a fuel valve movement varies with operating conditions such as altitude and the speed of the compressor. Thus a static pressure sensing tube 54 located in the vicinity of the engine senses ambient pressure and transmits the sensed pressure to actuating bellows 56. Additionally, compressor speed is transmitted by mechanical connection 58 to the governor 60 where the rotating speed signal is transformed to a force responsive to speed and applied to link 62. The pressure and speed signals are combined by link 64 which is further operative to position rack 66 and gear 68 which transmits the combined speed-pressure compensation signal to controller 16. It should be understood that pressure or speed signals or other significant engine operating conditions may be applied jointly or severally to position rack 66 as the system designer chooses depending on what conditions engine test data indicates affects the compressor speed response rate. Throttle 70 and a mechanical linkage system indicated by dashed lines 72 transmit input signals to controller 16 which indicate a desired value of compressor speed. A feedback signal representative of the actual value of compressor speed is transmitted by mechanical connection 74 to controller 16. The linkage network 76 additively combines two outputs of the controller 16 and positions the lever 52 or manipulated variable.

Returning to FIGURE 3, my controller 16 has a housing 80 which forms first and second cylindrical chambers 82 and 84. First and second differential area pistons 86 and 88 are disposed in chambers 82 and 84 respectively. A regulated pressure control fluid derived from a source, not shown, is supplied by a conduit 90 to the smaller area side of each of said differential area pistons. Restrictive bleed or orifice members 92 and 94 are contained in pistons 86 and 88 respectively to permit passage of a limited quantity of control fluid to the side of said pistons having the larger area. Servo control valves 96 and 98 are connected by passage means to the larger area sides of pistons 86 and 88 respectively to control the fluid pressure of the control fluid acting on the larger faces as a function of the position of said servo control valves and thus said valves control piston movement. For example, when servo valve 96 is closed the fluid pressure in chamber 82 acting on the larger face of piston 86 equals the control fluid pressure on the smaller face thus causing piston movement in the leftward direction because of the differential area over which the fluid pressure forces are acting. Full opening of servo valve 96 causes a decrease in fluid pressure acting on the larger face of piston 86 sufficiently to enable the fluid pressure forces to move piston 86 to the right. It will be noted that servo valve 96 will have an intermediate or null position between the extremes described wherein the fluid pressure forces acting on either side of piston 86 are equal and no piston movement results. The operation of servo control valve 98 and the fluid pressure forces acting on piston 88 is similar to that of piston 86 up to the point described with the exception that opening of valve 98 causes leftward movement of piston 88 instead of rightward movement as in the case of piston 86. As previously mentioned pistons 86 and 88 are interconnected by means of linkage 76 to provide a combined output. Controller 16 further includes first and second pivoted levers 100 and 102 for positioning servo valves 96 and 98 respectively as a function of the forces tending to rotate said levers. A first input or reference force is applied to lever 100 tending to rotate said lever clockwise by means of throttle 70, linkage 72, cam 104 and spring 106. A second opposing or feedback force is applied to lever 100 in a direction tending to rotate said lever counterclockwise by means of shaft 74, gears 108, shaft 110, and force producing flyweights 112. It is to be recalled that in the system shown in FIGURE 4, shaft 74 rotates at a speed proportional to compressor 34 speed such that the force tending to position lever 100 counterclockwise varies with compressor speed (controlled variable). The opposing forces generated by spring 106 and governor 112 are designed in magnitude such that lever 100 maintains servo valve 96 in its null position when the actual speed of compressor 34 equals the speed requested by throttle 70. Should the speed of compressor 34 be less than that requested by throttle 70, valve 96 opens and piston 86 moves to the right moving the lower end of linkage 76 in a direction to increase fuel flow and thus compressor speed. When compressor speed exceeds that requested, servo valve 96 closes and the reverse corrective action occurs. Lever 100 will not assume its null position unless the forces acting thereon are in balance, thus piston 86 will continue to position fuel valve 50 as long as any deviation between desired and actual compressor speed exists. The rate at which piston 86 moves at any instant is determined by the force unbalance existing across said piston which in turn is determined by the amount valve 96 deviates from its null position. If for example, actual compressor speed exceeds that requested by a certain unit, the excess force produced by flyweights 112 will be offset by additional force created by compression of spring 106 through an increment of distance. Should then compressor speed exceed requested speed by two units lever 100 will be further rotated and spring 106 compressed an additional increment. Thus it will be observed that the error between actual and desired speed determines the degree of deviation of valve 96 from its null position and thus the rate at which piston 86 travels. Thus the servo 86 and attendant control valve 96 form a type 1 servo motor as previously defined.

Lever 102 is operative to position control valve 98 in response to the forces or more particularly the force moments acting thereon. A first input or reference force is applied by means of throttle 70, linkage 72, cam 114, and spring 116 to lever 102 tending to rotate said lever counterclockwise. A second feedback force reflecting the actual speed of compressor 34 is transmitted by shaft 74 and flyweights 118 to lever 102 tending to position said lever clockwise. A third, position, force is applied by spring 120 through pivoted table member 122 which has a pivot pin 124 running along the rearward edge thereof and roller or movable fulcrum 126 to lever 102 in a direction aiding said first force and opposing said second force. Roller 126 is connected to piston 88 by means of rod 128 such that the distance said third force is applied from the pivot point of lever 102 is varied with the position of piston 88. Spring 120 has a movable retainer 130 operative to contain the lower end of said spring which retainer may for the moment be considered fixed such that the force applied to lever 126 is constant. Assume that the position of throttle 70, speed of compressor 34 and position of piston 88 are such that the force moments acting on lever 102 are balanced and valve 98 is maintained in its null position. If the speed of compressor 118 should then decrease such as for example would occur when engine 30 encounters a greater load condition, the force produced by flyweights 118 decreases and lever 102 rotates counterclockwise opening servo valve 98 and moving piston 88 leftward. Leftward movement of piston 88 positions the lower end of linkage 76 in a fuel increasing direction and additionally displaces roller 126 to the left decreasing the moment arm of the third force applied by spring 120. Thus the decrease of force produced by flyweights 118 which upset the force moment balance of lever 102 displaces piston 88 which in turn tends to restore the force moment balance by two means; first, by increasing fuel and thus increasing speed which tends to increase the force output of weights 118; and secondly, by decreasing the moment arm of the force applied by spring 120 and which opposes that produced by flyweights 118. Thus the speed of compressor 34 will not assume its original value prior to deviation by operation of piston 88 alone, inasmuch as the reduced moment arm of the force applied by spring 130 is in part operative to rebalance lever 102. Therefore a constant error between desired speed requested by throttle 70 and actual speed as indicated by flyweights 118 exists which is operative to displace piston 88 a certain distance from its null position. Thus the displacement of piston 88 is proportional to the error between actual and desired speed and said servo therefore comprises a type 0 servo motor as previously defined. It should be observed at this point that the constant error necessary to displace the type 0 servo 26 will be reduced to zero by operation of the type 1 servo 24 which as previously described will continue to correct or move until error is non-existent at which time piston 88 will have returned to its norm position. Thus the advantage secured by interconnecting servos 24 and 26 is to obtain the no error characteristic of a type 1 servo and the greater stability and a measured gain of a type 0 servo.

The lower retainer 130 containing spring 120 is pinned at 132 to pivoted lever 134. A cam 136 interconnected for rotation with external rack and gear 66 and 68 contacts one end of lever 134 to rotate said lever and vary the third force acting on lever 102 in response to the height of cam 136. Variation of the magnitude of said third force varies the distance through which piston 88 must travel to rebalance lever 102 and thus varies the gain or proportion of piston output travel to error input for the type 0 servo 26. To illustrate, it will be recalled in the preceding paragraph a given displacement of piston 88 and roller 126 was obtained when the force output of flyweights 118 deviated from its requested value. Assuming the same variation in compressor 34 speed, roller 126 will have to travel through a greater distance to rebalance lever 102 if the force applied by spring 120 is decreased as by clockwise rotation of lever 134. Thus the input error to travel output relationship or gain is varied by lever 134.

FIGURE 5 is a diagrammatic showing of a system wherein my controller is utilized to control an air driven turbine which now becomes the controlled device. Pressurized air from a source, not shown, is introduced into conduit 140 and passes through an air control valve contained in housing 142 to the inlet conduit 144 of the air driven turbine 146. Turbine 146 includes a rotating output shaft member 148. When it is desired to control the speed of shaft 146 in response to variations in position of valve 142, shaft speed becomes the controlled variable and valve position the manipulated variable. Where the air supply delivered to conduit 140 is obtained from the atmosphere local to turbine 146 the time response of turbine speed to changes in valve position will be reduced by a decreasing air density. Thus air density may be sensed by bellows 150 and transmitted to controller 16 as a force or position signal to compensate the gain of type 0 servo 26 and increase system responsiveness.

Another system wherein my invention may be utilized is illustrated by FIGURE 6 where the output connection 18 of the controller 16 is operative to position a control surface 152 of the airframe 154. The controlled device in this example is the airframe 154, the manipulated variable is the control surface 152, and the controlled variable would be the heading or direction of the airframe as when it is under control of an autopilot system. As altitude increases and/or the propulsion speed of the airframe 154 decreases, the time response of the change in aircraft position (controlled variable) to movement of the control surface 152 (manipulated variable) is increased. A Pitot tube 156 may be utilized to sense both airframe propulsion speed and altitude by velocity and static pressure probes, as is well known, which pressures may be converted to a useful position signal by means of device 158 to comprise the compensation signal transmitted to controller 16. In a system of this type the comparator 12 would be part of an aircraft gyroscope because of the need to orientate aircraft position to a reference such as the true north direction. Inasmuch as most well known gyroscopes produce an electrical output signal, a torque motor 160 is provided to convert the electrical error signal to a position or force signal.

FIGURE 7 shows a still further system wherein the controlled device is a rocket 162 having a manipulated variable such as a control surface 164 and the controlled variable is the rocket position or direction as with the case of the airframe 154 in FIGURE 6. As a rocket is propelled through space the continuous burning and consumption of fuel causes the rocket mass to decrease and causes also a shifting of the center of gravity. This mass and center of gravity variation affect the ability of the control surface 164 to change rocket direction such that the mass variation is the operating condition of the rocket 162 which varies the time response of the controlled variable to the manipulated variable. The changing rocket mass may be determined in a variety of ways depending on the type of rocket. For example, where the rate of fuel burning is determinable in advance, a timing mechanism may be utilized to provide a compensation signal 22. In rockets of the type having a nitrogen pressurized liquid fuel supply, the pressure and temperature of the nitrogen may be sensed to indicate its volume which when subtracted from total tank volume will indicate the remaining propellant volume and thus also its mass to provide the compensation signal 22. Except for the nature of the compensation signal, the system of FIGURE 7 operates substantially the same as that of FIGURE 6. It should be understood that control surface 164 should be broadly considered as a member for controlling rocket heading. If rocket heading is controlled by other means such as a movable nozzle or the like, output member 18 may be readily connected to said other control means.

The FIGURES 4 through 7 illustrate various controlled devices with which the controller of the present invention may be used. These devices have in common a controlled and a manipulated variable and operate under varying operating conditions which affect the time response of the controlled variable to changes in the manipulated variable. The common characteristics of these controlled devices define the characteristics of a family of controlled devices with which the present invention may be effectively used. Accordingly, it should be understood that the specific structure of the embodiment of my controller which has been disclosed may be suitably varied within the skill of the ordinary mechanic to adapt said controller to other devices of the class described.

I claim:

1. Control apparatus for use with a device having a manipulated and a controlled variable wherein the time response of said controlled variable changes with operating conditions comprising: reference means operative to produce an input force reflective of a desired value at which said controlled variable is to be maintained; feedback means operative to produce a feedback force reflective of the actual value said controlled variable is being maintained; a comparator interconnecting said reference means and said feedback means to produce an error force reflective of the error between said input and feedback forces; a type 0 servo motor having a first output member and connected to said comparator; said type 0 servo motor being operative to displace said first output member a distance proportional to said error force; a type 1 servo motor having a second output member and connected to said comparator; said type 1 servo motor being operative to displace said second output member at a rate proportional to said error force; means interconnecting said first and second output members and said manipulated variable to control said manipulated variable as a combined function of the position of said first and second output members; and means responsive to the operating conditions of said device connected to said type 0 servo motor operative to vary the proportion said first output member is displaced in response to said error force to compensate for variations in response between said controlled and manipulated variables.

2. Control apparatus for use with a device having a manipulated and a controlled variable wherein the time response of said controlled variable changes with operating conditions comprising: a comparator operative to produce an error force reflective of the difference between a desired and actual value of said controlled variable; type 0 and type 1 servo motors having interconnected output members operative to position said manipulated variable; said servo motors being connected to said comparator and responsive to said error force; and means responsive to the operating conditions of said device connected to said type 0 servo motor operative to vary the gain thereof to compensate for variations in response between said controlled and manipulated variables in response to variations in said operating conditions.

3. Control apparatus for use with a device having a manipulated and a controlled variable wherein the time response of said controlled variable changes with operating conditions comprising: input force means operative to produce an input force reflective of a desired value of operation of said controlled variable; feedback means operative to produce a feedback force reflective of the actual value of operation of said controlled variable; a pivoted lever interconnecting said input force means and said feedback means and positionable in response to the forces acting thereon; a hydraulic servo motor including a control valve therefor operative to control said manipulated variable; said control valve being connected to said pivoted lever and positioned thereby; a resilient force producing member producing a reference force; a movable fulcrum member interconnecting said resilient force producing member and said pivoted lever to transmit said reference force to said pivoted lever; said movable fulcrum being connected to said servo motor to vary the point of application of said reference force on said pivoted lever; and means responsive to said operating conditions connected to said resilient force producing member operative to vary said reference force to compensate for variations in response between said controlled and manipulated variables.

4. Control apparatus as claimed in claim 3 including a type 1 servo motor connected to said input force means and said feedback means operative to control said manipulative variable.

5. Control apparatus as claimed in claim 3 wherein said resilient force producing member is a spring and retainer and said means responsive to said operating conditions is operative to vary the position of said retainer.

6. A controller operative to position an output member in response to an error input force comprising: type 0 and type 1 servo motors connected to said output member and responsive to said error input force to control said output member as a function of said error input force; and means connected to said type 0 servo motor for varying the gain thereof in proportion to a response characteristic of the device to be controlled.

7. Control apparatus for use with a gas turbine engine having a compressor, a turbine for driving said compressor, a combustion section delivering exhaust products to said turbine, and a fuel control valve positionable to control a supply of fuel to said combustion section comprising: a comparator operative to produce an error force reflective of the difference between desired and actual compressor speed; a type 0 and a type 1 servo motors having interconnected output members operative to position said fuel control valve; said servo motors being connected to said comparator and responsive to said error force; and means responsive to compressor speed connected to said type 0 servo motor operative to vary the gain thereof in response to variations in compressor speed.

8. Control apparatus as claimed in claim 7 wherein said last named means is additionally responsive to an engine operating pressure.

9. A controller for positioning an output member in response to an error input force comprising: a servo motor including a control valve therefor connected to said output member; a pivoted lever having a fixed pivot and connected to said control valve; means applying said error input force to said pivoted lever; a spring arrangement including a first and second retainer at opposite ends thereof; a movable fulcrum member interconnecting said first retainer and said pivoted lever to transmit a force produced by said spring to said pivoted lever; means operatively connecting said movable fulcrum to said servo motor so that the point at which the force produced by said spring member is applied to said lever means is varied in proportion to movement of said servo motor; means for varying the position of said second retainer; and a type 1 servo motor connected to said output member and responsive to said error input force.

10. Control apparatus for use with a gas turbine engine having a compressor, a turbine for driving said compressor, a combustion section delivering exhaust products to said turbine, and a fuel control valve positionable to control a supply of fuel to said combustion section comprising: a comparator operative to produce an error force reflective of the difference between desired and actual compressor speed; a type 0 and a type 1 servo motor having interconnected output members operative to position said fuel control valve; said servo motors being connected to said comparator and responsive to said error force; and means responsive to an engine operating pressure connected to said type 0 servo motor operative to vary the gain thereof in response to variations in engine pressure.

11. Control apparatus for use with a gas turbine engine having a compressor, a turbine for driving said compressor, and an engine control element positionable to control turbine speed comprising: first and second pivoted control levers; first and second hydraulic servo motors each having a servo control valve connected respectively to said first and second control levers so that each hydraulic servo motor is controlled in response to its respective control lever movement, lever means interconnecting said first and second servo motors with said engine control element to control turbine speed in response to the combined movements of said servo motors, speed responsive means producing a force output proportional to turbine speed, said speed responsive means connected to each of said first and second control levers to provide a control force to each which is proportional to turbine speed, first and second reference force producing means connected respectively to each of said first and second control levers to provide a reference force thereto opposing the force proportional to turbine speed so that each of said control levers is positioned about its pivot in response to the error force between turbine speed force and reference force, feedback force producing means, a movable fulcrum interconnecting said feedback force producing means and said first control lever to apply a feedback force thereto opposing said turbine speed force, means interconnecting said movable fulcrum and said first servo motor to vary the force moment of said feedback force on said first control lever in response to the position of said first servo motor to thereby establish a proportional relationship or gain between the error force on said first control lever and the position of said first servo motor, compensation means responsive to a condition of engine operation indicative of the response of turbine speed to changes in said control element, said compensation means being connected to said feedback force producing means to vary the feedback force acting on said first control lever and altering the proportional relationship or gain established between said first control lever and said first servo motor.

12. Control apparatus as set forth in claim 11 wherein said second servo motor is a type 1 servo motor whereby said second servo motor is operative to control turbine speed to eliminate substantially all error force acting on said second control lever.

13. Control apparatus as set forth in claim 12 wherein the forces acting on both of said first and second control levers are in balance at a given controlled turbine speed.

14. Control apparatus as set forth in claim 13 including means for coordinately adjusting said first and second reference force producing means to alter the controlled turbine speed.

15. Control apparatus as set forth in claim 14 wherein said compensation means is responsive to an engine air pressure.

References Cited in the file of this patent
UNITED STATES PATENTS

| | | |
|---|---|---|
| 1,687,109 | Schmidt | Oct. 9, 1928 |
| 2,364,817 | Reggio | Dec. 12, 1944 |
| 2,631,677 | Kochenburger et al. | Mar. 17, 1953 |
| 2,646,946 | Newton | July 28, 1953 |
| 2,662,372 | Offner | Dec. 15, 1953 |
| 2,701,111 | Schuck | Feb. 1, 1955 |
| 2,743,901 | Garraway | May 1, 1956 |
| 2,764,868 | Watson et al. | Oct. 2, 1956 |
| 2,824,710 | Hall | Feb. 25, 1958 |
| 2,851,855 | Gamble | Sept. 16, 1958 |
| 2,873,074 | Harris et al. | Feb. 10, 1959 |
| 2,880,384 | Surtees | Mar. 31, 1959 |
| 2,924,070 | Eastman | Feb. 9, 1960 |
| 2,926,681 | Chilman | Mar. 1, 1960 |

OTHER REFERENCES

"Servomechanisms and Regulating System Design," 2nd ed. (Chestnut et al.), John Wiley & Sons (New York), 1951, 1959, pages 219 and 552, and page 221.

"Servomechanism Fundmentals," 2nd ed. (Lauer et al.), McGraw-Hill (New York), 1947, 1960, page 145 of interest.